Patented Aug. 24, 1926.

1,597,370

UNITED STATES PATENT OFFICE.

FRANCIS ARTHUR FREETH, OF SANDIWAY, AND LESLIE ALEXANDER MUNRO, OF NORTHWICH, ENGLAND, ASSIGNORS TO SOLVAY PROCESS COMPANY, OF SOLVAY, NEW YORK, A CORPORATION OF NEW YORK.

REMOVAL OF CALCIUM AND MAGNESIUM FROM ROCK-SALT BRINE.

No Drawing. Application filed August 21, 1920, Serial No. 405,169, and in Great Britain February 15, 1919.

This invention relates to an improved process for removing calcium and magnesium from rock salt brine or solutions of rock salt in water, hereinafter called brine. It is well known that brine may be purified by adding to it a mixture of carbonate of soda and hydrate of calcium, hereinafter called the reagents. The reagents are added in such quantities that the lime is equivalent to the magnesium with which it enters into double decomposition and the sodium carbonate is equivalent to the calcium present in the brine+the calcium added as a reagent. The following equation illustrates the reaction for the case in which the calcium and magnesium ordinarily present in the brine are in equivalent proportions.

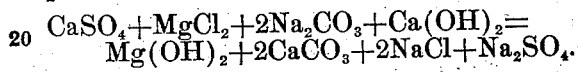

When this process is carried out in practice, it is found that the colloidal mixed precipitate settles extremely slowly so that the clear liquid can only be removed by decantation after the lapse of many hours.

Our invention depends on the observation that it is possible to transform the physical condition of this precipitate so that it assumes a form in which it settles very rapidly.

In the process according to our invention therefore we first submit the liquid and precipitate to treatment during a short "induction period" in such manner as to obtain this peculiar transformation and we then rapidly separate the clear liquor by decantation.

The chief factors governing the transformation are as follows:—

(a) Excess of hydroxyl ion, as distinct from excess of carbonate, is to be rigorously avoided. Hitherto it has been usual to add from 10% to 100% excess of both reagents and as the precipitate does not dissolve in such excess, it would be expected that the excess would exert a "salting out" action tending to coagulate the colloidal precipitate. We have found on the contrary that the excess of OH ion should be as small as possible consistent with successful operation of the process on a large scale. The amount of Ca(OH)$_2$ added must therefore be very carefully controlled by analysis of the brine as often as required.

The effect of excess of OH ion is to accelerate the induction period enormously so that when the precipitate is agitated, it passes very quickly through the stage in which it can settle rapidly and then disintegrates when its power of settling rapidly is lost. This result is curious, since in many cases of colloidal solution or suspension, the stability of the colloid increases as the solution approaches neutrality, whereas in this case the stability decreases as the liquid becomes less alkaline, so that the precipitate settles more rapidly. Whatever may be the theory, we have observed the definite fact that excess of hydroxyl ion should be kept as low as possible.

(b) The liquid and precipitate must be agitated enough to mix the reagents thoroughly with all parts of the liquid. But we have also found that it is most important not to stir too long, since in that case the precipitate is partially disintegrated into fine particles and it is then impossible to obtain rapid and complete settling. A limited amount of agitation is therefore employed and in practice we prefer to stir gently throughout the induction period though in some cases we may stir violently for a brief part of the induction period (taking care to avoid disintegration) and then leave the mixture quiescent during the remainder of the induction period while the transformation is being completed.

(c) It is further necessary to avoid the presence of disintegrated precipitate from a previous operation and this is particularly important in intermittent working.

(d) While rise of temperature increases the velocity of settling, it also accelerates the induction period so that at higher temperatures great care must be taken not to agitate too much otherwise disintegration occurs.

(e) The amount of impurities in the brine affects the result. If the percentage of magnesium is higher than usual, the precipitate will tolerate more stirring without disintegration.

In general it is necessary to balance or correlate the above factors for each particular brine but we will give an example for one kind of brine at one temperature; bearing in mind the above general features of the process it will be readily possible to vary these conditions to suit other brines or to work at other temperatures. Tests on a small scale must however be carefully checked by large scale experiments in view of the difference in the kind of agitation obtainable on the large scale. In all cases however the essential feature is to subject the brine and precipitate to treatment during a short induction period in which the precipitate is transformed into a different physical condition, and to avoid stringently any treatment which causes disintegration. There is an optimum treatment which must not be prolonged too far. After treatment the clear liquor is then decanted rapidly.

*Example.*

To a brine containing calcium and magnesium expressed as 0.055 grammes MgO and 0.252 grammes CaO per 100 cubic centimetres maintained at a temperature of about 25° C. and stirred with a stirrer having a peripheral speed of about 40 feet per minute and of such design that an even gentle motion is imparted to all portions of the liquid, there is added, 0.63 grammes $Na_2CO_3$ and 0.102 grammes $Ca(OH)_2$ per 100 cubic centimetres of brine. After stirring for half an hour the precipitate subsides rapidly and can be settled by any well known means; the clear brine is free from calcium and magnesium.

The process may be conducted either intermittently, in which case the reagents may if desired be added before stirring begins, or continuously, in which case the stirring is preferably continued all the time; in continuous operation the rate of flow of liquid is adjusted with respect to the volume of the containing vessel so that the particles are exposed to agitation for about half an hour.

We declare that what we claim is:—

1. The process of effectively freeing brine from calcium and magnesium impurities, which consists in first determining the amount of said impurities contained in the brine and then adding to the brine lime to the precise extent indicated by theory for the formation and precipitation of the magnesium with but a very slight, insignificant excess of lime, insufficient to cause material retardation in the settling of the precipitate over the settling rate which obtains when the relation of magnesium expressed as MgO to the lime as $Ca(OH)_2$ is as .055:.102, adding to the brine also sodium carbonate in an amount sufficient to satisfy that needed for the formation of precipitatable calcium salt from both the calcium originally present in the brine and that added as lime.

2. The process of effectively freeing brine from calcium and magnesium impurities, which consists in first determining the amount of said impurities contained in the brine and then adding to the brine lime to the precise extent indicated by theory for the formation and precipitation of the magnesium with but a very slight, insignificant excess of lime, insufficient to cause material retardation in the settling of the precipitate over the settling rate which obtains when the relation of magnesium expressed as MgO to the lime as $Ca(OH)_2$ is as .055:.102, adding to the brine also sodium carbonate in an amount sufficient to satisfy that needed for the formation of precipitatable calcium salt from both the calcium originally present in the brine and that added as lime and subjecting the admixture of brine and precipitates to limited agitation, insufficient to cause disintegration of the precipitated particles, but sufficient to allow a change in the physical condition of the precipitate to take place in the direction of increasing the rate of sedimentation thereof.

3. A process as claimed in claim 1 in which the liquid and precipitate are maintained at a temperature of about 25° C.

In witness whereof, we have hereunto signed our names this 5 day of August 1920.

FRANCIS ARTHUR FREETH.
LESLIE ALEXANDER MUNRO.